United States Patent Office 3,518,270
Patented June 30, 1970

3,518,270
6,7,12,13 - TETRAHYDRO - 6,12 - IMINO - 5H - BENZO[5,6]CYCLOOCT[1,2 - b]INDOLE DERIVATIVES AND PROCESS FOR THEIR PRODUCTION
John Shavel, Jr., Mendham, and Harold Zinnes, Rockaway, N.J., assignors to Warner-Lambert Pharmaceutical Company, Morris Plains, N.J., a corporation of Delaware
No Drawing. Continuation-in-part of application Ser. No. 634,133, Apr. 27, 1967. This application May 17, 1967, Ser. No. 644,752
Int. Cl. C07d 35/10
U.S. Cl. 260—286
9 Claims

ABSTRACT OF THE DISCLOSURE

The invention describes compounds of structure I

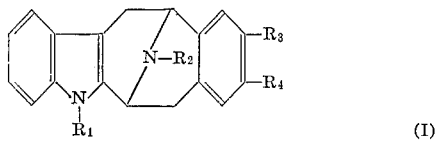

and a method for their production. They are prepared by cyclization of compounds of structure II

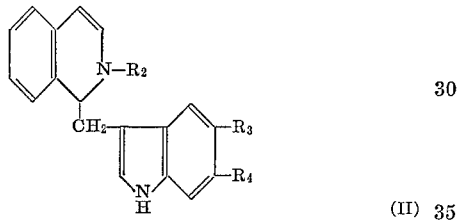

by treatment with excess dilute acid. Compounds of structure I, wherein R is H, can be alkylated. Compounds of structure I, wherein $R_2$ is benzyl, can be debenzylated. Compounds of structure I are useful as central nervous system stimulants, central nervous system depressants and useful as antifungal agents.

---

This application is a continuation-in-part of our copending application Ser. No. 634,133, filed Apr. 27, 1967.

The present invention relates to 6,7,12,13-tetrahydro-6,12-imino - 5H - benzo[5,6]cyclooct[1,2-b]indole derivatives as well as to a process for the production of these indole derivatives.

The indole derivatives of this invention may be represented by the formula:

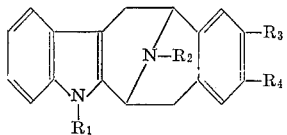

wherein $R_1$ is hydrogen, lower alkyl or aralkyl; $R_2$ is hydrogen, lower alkyl, or aralkyl; $R_3$ is hydrogen or lower alkoxy; and $R_4$ is hydrogen or lower alkoxy.

In the above definition lower alkyl and the alkyl portion of lower alkoxy or the alkyl portion of aralkyl contains from 1 to 6 carbon atoms such as methyl, ethyl, propyl, isopropyl, butyl, isobutyl, and the like. The aryl portion of aralkyl includes both monohomocyclic ring systems such as phenyl as well as monoheterocyclic ring systems such as furyl, pyridyl, and the like.

This invention also includes within its scope acid addition salts of the subject compounds as well as various dosage forms containing the same.

The compounds of this invention in which $R_3$ is H and $R_4$ is lower alkoxy are useful as central nervous system stimulants in a mammalian host. They are administered at a dosage level of 100 to 500 mg. several times daily, orally or by injection, to produce the desired stimulant effect. Compounds in which both $R_3$ and $R_4$ are lower alkoxy are useful as central nervous system depressants. A dose level of 100 to 500 mg. several times daily produces the desired depressant effect.

In addition, the compound in which $R_1=CH_3$, $R_2=H$, $R_3=H$, $R_4=$methoxy, has been found to be useful in inhibiting the growth of fungi such as *T. mentagrophytes*, *Aspergillus niger*, and *C. neoformans* in the presence of serum at concentration of 60 to 150 mg./ml. To use it as an antifungal agent, it is combined with an inert carrier such as talc and apply as a 1% to 10% dusting powder.

According to the novel process of this invention, the above compounds may be prepared by treating a 1-indolylmethyl-1,2-dihydroisoquinoline of the formula:

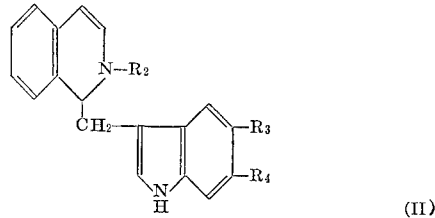

with an excess of a dilute aqueous acid at about 90° to 98° C.

The preparation of the starting compound II is fully described in our copending application Ser. No. 634,133 filed Apr. 27, 1967, and entitled "3-Indolylmethyl-3,4-Dihydroisoquinoline Derivatives and Process for Their Production."

The foregoing reaction may be illustrated by the following scheme:

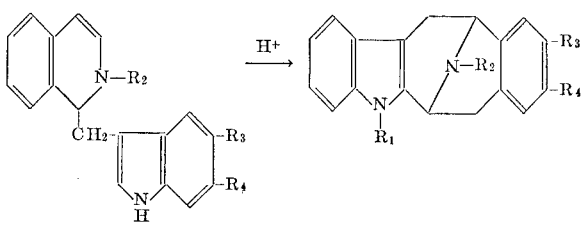

wherein $R_1$ is hydrogen, $R_2$ is alkyl or aralkyl.

In order to obtain those compounds of the invention wherein $R_1$ is alkyl or aralkyl, compounds in which $R_1$ is hydrogen are treated with an appropriate alkyl halide such as methyl iodide, ethyl bromide, or an aralkyl halide such as benzyl bromide and the like in the presence of a base such as sodium amide in liquid ammonia.

In order to obtain those compounds in which $R_2$ is hydrogen, the compounds of this invention wherein $R_2$ is aralkyl are hydrogenated in the presence of a suitable catalyst. Thus, for example, the hydrogenation may be effected by treating the starting compound with gaseous hydrogen under pressure in the presence of palladium on carbon.

The compounds of this invention form acid addition salts. Such salts are readily prepared by the usual methods, such as, for example, the reaction of a stoichiometrically equivalent amount of the base and the desired acid in an inert common solvent. Examples of acids which are suitable for the preparation of acid addition salts of the amine base of this invention are inorganic acids, such as, for example, hydrochloric, nitric, sulfuric, phosphoric, and the like acids, and organic acids, such as, for example, benzoic, acetic, salicyclic, maleic, tartaric, citric and the like acids. The preferred salts are those which are pharmaceutically acceptable, that is, they are acid addition salts which are no more toxic than the bases from which they are prepared and which possess the necessary physical properties that render them suitable for incorporation into dosage forms in combination with the desired pharmaceutical carriers.

The following examples are included in order further to illustrate the invention. All temperatures are given in degrees centigrade. Room temperature is about 20° C. to 30° C.

EXAMPLE 1

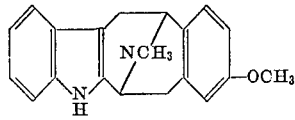

EXAMPLE 1

6,7,12,13-tetrahydro-9-methoxy-14-methyl-6,12-imino-5H-benzo[5,6]cyclooct[1,2-b]indole A mixture of 173 g. (0.4 mole) of 1-(indol-3-ylmethy)-6-methoxy isoquinoline methiodide, 30.3 g. (0.8 mole) of lithium aluminum hydride, and 4000 ml. of tetrahydrofuran is stirred overnight at room temperature. The reaction mixture is hydrolyzed and filtered. To the filtrate is added 2730 ml. of 1 N hydrochloric acid and the tetrahydrofuran is distilled off. After the addition of 1500 ml. of methanol and 1360 ml. more in hydrochloric acid, the mixture is refluxed for 1 hour and the methanol is removed by distillation. The resulting aqueous solution is made basic with ammonium hydroxide and extracted with dichloromethane. Concentration of the dried dichloromethane solution gives a total of 93 g. of 6,7,12,13-tetrahydro-9-methoxy-14-methyl-6,12-imino - 5H - benzo[5,6]cyclooct[1,2-b]indole as a crystalline product (combination of 3 crops), M.P. 269–270° dec. Recrystallization from methanol-dichloromethane gives material,M.P. 271–272° dec.

Analysis.—For $C_{20}H_{20}N_2O$. Calc'd (percent): C, 78.92; H, 6.62; N, 9.20. Found (percent) C, 78.86; H, 6.66; N, 9.01.

The phosphate salt, recrystallized from water has M.P. 195–205° dec.

Analysis.—For $C_{20}H_{29}N_2O \cdot H_3PO_4 \cdot \frac{1}{2}H_2O$ (percent) Calc'd: C, 58.39; H, 5.88; N, 6.81; P, 7.53. Found (percent): C, 58.64; H, 5.99; N, 6.64; P, 7.43.

EXAMPLE 2

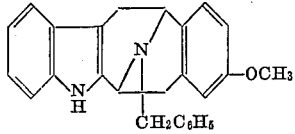

6,7,12,13-tetrahydro-9-methoxy-14-benzyl-6,12-imino-5H-benzo[5,6]cyclooct[1,2-b]indole A mixture of 9.6 g. (0.021 mole) of 1-(indol-3-yl-methyl)-6-methoxy-isoquinoline benzyl bromide salt, 2.5 g. of lithium aluminum hydride and 210 ml. of tetrahydrofuran is stirred at room temperature for 18 hours.

The reaction mixture is hydrolyzed in the usual manner and filtered. To the filtrate is added 205 ml. of 1 N hydrochloric acid and the tetrahydrofuran is distilled off. After the addition of 300 ml. of methanol and 103 ml. more 1 N hydrochloric acid, the mixture is refluxed for 1 hour and the methanol is removed by distillation. The resulting aqueous solution is made basic with ammonium hydroxide and extracted with dichloromethane. The residue from evaporation of the dried dichloromethane solution is triturated with methanol to give 6.8 g. of 6,7,12,13-tetrahydro-9-methoxy-14-benzyl - 6,12 - imino-5H-benzo[5,6]cyclooct[1,2-b]indole as a crystalline product, M.P. 230–232° dec. Recrystallization from methanol-dichloromethane gives material, M.P. 231.5–232.5° dec.

Analysis.—For $C_{26}H_{24}N_2O$. Calc'd. (percent): C, 82.07; H, 6.36; N, 7.36. Found (percent): C, 81.93; H, 6.38; N, 7.22.

EXAMPLE 3

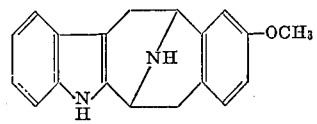

6,7,12,13-tetrahydro-9-methoxy-6,12-imino-5H-benzo[5,6]cyclooct[1,2-b]indole

A solution of 7.0 g. of 6,7,12,13-tetrahydro-9-methoxy-14-benzyl-6,12-imino - 5H - benzo[5,6]cyclooct[1,2-b]indole in 200 ml. of glacial acetic acid is hydrogenated at atmospheric pressure using 1.4 g. of 5% palladium on carbon as the catalyst. The catalyst is filtered off, and the filtrate is added to 700 ml. of ice-water. The solution is made basic with ammonium hydroxide and the resulting precipitate is collected. Trituration with methanol gives 5.5 g. of 6,7,12,13-tetrahydro-9-methoxy-6,12-imino-5H-benzo[5,6]cyclooct[1,2-b]indole, M.P. 289–291° dec. Recrystallization from methanol-dichloromethane gives material, M.P. 290–291° dec.

Analysis.—For $C_{19}H_{18}N_2O$ Calc'd (percent): C, 78.59; H, 6.25; N, 9.65. Found (percent): C, 78.46; H, 6.13; N, 9.51.

EXAMPLE 4

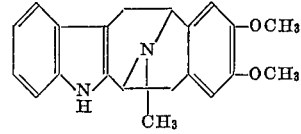

6,7,12,13-tetrahydro-9,10-dimethoxy-14-methyl-6,12-imino-5H-benzo[5,6]cyclooct[1,2-b]indole A mixture of 20.7 g. (0.045 mole) of 1-(indol-3-ylmethyl)-6,7-dimethoxyisoquinoline methiodide, 5.1 g. (0.135 mole) of lithium aluminum hydride, and 450 ml. of tetrahydrofuran is stirred for 18 hours at room temperature. The reaction mixture is hydrolyzed and filtered. To the filtrate is added 300 ml. of 1 N hydrochloric acid and the tetrahydrofuran is distilled off. After the addition of 200 ml. of methanol and 150 ml. more 1 N hydrochloric acid, the mixture is refluxed for 1 hour and the methanol is distilled off. The aqueous mixture is made basic with ammonium hydroxide and extracted with dichloromethane. The extract is triturated with methanol to give 12 g. of 6,7,12,13 - tetrahydro - 9,10 - dimethoxy - 14 - methyl-6,12-imino-5H-benzo[5,6]cyclooct[1,2-b]indole as a crystalline product, M.P. 225–227°. Recrystallization from methanol-dichloromethane gives 10.5 g. of material, M.P. 227–228°.

Analysis.—For $C_{21}H_{22}N_2O$. Calc'd (percent): C, 75.42; H, 6.63; N, 8.38. Found (percent): C, 75.37; H, 6.75; N, 7.17.

The hydrochloride, recrystallized from ethanol-methyl ethyl ketone, has M.P. 234–240° dec.

*Analysis.*—For $C_{21}H_{22}N_2O_2 \cdot HCl$. Calc'd (percent): C, 68.01; H, 6.25; Cl, 9.56; N, 7.55. Found (percent): C, 68.29; H, 6.37; Cl, 9.72; N, 7.61.

EXAMPLE 5

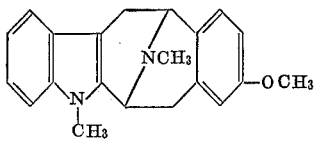

6,7,12,13-tetrahydro-9-methoxy-5,14-dimethyl-6,12-imino-5H-benzo[5,6]cyclooct[1,2-b]indole To a solution of 5.2 g. (0.132 mole) of sodium amide in 1000 ml. of liquid ammonia is added a slurry of 20 g. (0.066 mole) of 6,7,12,13-tetrahydro-9-methoxy-14-methyl-6,12-imino-5H-benzo[5,6]cyclooct[1,2-b]indole in 500 ml. of tetrahydrofuran. The solution is stirred for 1 hour, 9.6 g. (0.068 mole) of methyl iodide is added, and stirring is continued for an additional hour. The ammonia is evaporated off, the tetrahydrofuran is removed using a rotary flash evaporator, and the residue is partitioned between dichloromethane and water. The dried dichloromethane solution is evaporated to a gummy residue which is dissolved in 1000 ml. of ether and treated with ethereal hydrogen chloride. The resulting precipitate is triturated with 2-butanone and recrystallized from ethanol to give 15.8 g. of the crystalline hydrochloride of 6,7,12,13-tetrahydro - 9 - methoxy - 5,14 - dimethyl - 6,12 - imino - 5H-benzo[5,6]cyclooct[1,2-b]indole, M.P. 264–265° dec. Recrystallization of a portion gives an analytical sample, M.P. 265.5–266.5°.

*Analysis.*—For $C_{21}H_{22}N_2O \cdot HCl$. Calc'd (percent): C, 71.08; H, 6.53; Cl, 9.99; N, 7.89. Found (percent): C, 70.99; H, 6.54; Cl, 10.13; N, 7.69.

Basification of an aqueous solution of the hydrochloride, extraction with dichloromethane, and evaporation of the solvent yields the amorphous base A filtered petroleum ether solution of the base is evaporated; the residue, after drying in vacuo at 80°, melts at 85–90° and shows a single spot on thin layer chromatography.

*Analysis.*—For $C_{21}H_{22}N_2O$. Calc'd (percent): C, 79.21; H, 6.96; N, 8.80. Found (percent): C, 78.95; H, 7.07; N, 8.61.

Refluxing an acetone solution of the base with methyl iodide results in precipitation of the methiodide, M.P. 306–307° dec.

*Analysis.*—For $C_{22}H_{25}IN_2O$. Calc'd (percent): C, 57.40; H, 5.47; N, 6.09. Found (percent): C, 57.47; H, 5.49; N, 6.27.

EXAMPLE 6

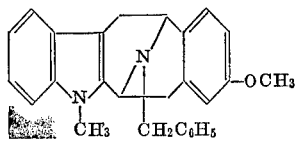

14-benzyl-6,7,12,13-tetrahydro-9-methoxy-5-methyl-6,12-imino-5H-benzo[5,6]cyclooct[1,2-b]indole To a solution of 5.85 g. (0.15 mole) of sodium amide in 1500 ml. of liquid ammonia is added a solution of 28.5 g. (0.075 mole) of 14-benzyl-6,7,12,13-tetrahydro-9-methoxy-6,12 - imino-5H - benzo[5,6]cyclooct[1,2-b]indole in 500 ml. of tetrahydrofuran. The solution is stirred for 1 hour, 10.86 g. (0.077 mole) of methyl iodide is added, and stirring is continued for an additional hour. The ammonia is evaporated off, the tetrahydrofuran is removed using a rotary flash evaporator, and the residue is partitioned between dichloromethane and water. The dried dichloromethane solution is evaporated to a residue which is recrystallized from ethanol-dichloromethane to give 26.9 g., of 14-benzyl-6,7,12,13-tetrahydro-9-methoxy-5-methyl-6,12 - imino - 5H-benzo[5,6]cyclooct[1,2-b]indole, M.P. 173–174°.

*Analysis.*—For $C_{27}H_{26}N_2O$. Calc'd (percent): C, 82.20; H, 6.64; N, 7.10 Found (percent): C, 83.18; H, 6.70; N, 7.03.

EXAMPLE 7

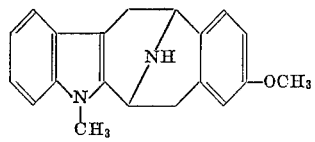

6,7,12,13-tetrahydro-9-methoxy-5-methyl-6,12-imino-5H-benzo[5,6]cyclooct[1,2-b]indole A solution of 12.0 g. (0.03 mole) of 14-benzyl-6,7,12,-13-tetrahydro-9-methoxy - 5 - methyl - 6,12-imino-5H-benzo[5,6]cyclooct[1,2-b]indole in 150 ml. of glacial acetic acid is hydrogenated at an initial pressure of 50 lb./sq. inch gauge using 1.2 g. of 5% palladium on carbon as the catalyst. The catalyst is filtered off and the filtrate is added to 400 ml. of ice-water. The solution is made basic with ammonium hydroxide and extracted with dichloromethane. Evaporation of the dried solution gives a residue which is triturated with ethanol to give 8.4 g. of the crystalline base, M.P. 142–145°. Recrystallization of a portion from ethanol gives an analytical sample, M.P. 146–147°.

*Analysis.*—For $C_{20}H_{20}N_2O$. Calc'd (percent): C, 78.92; H, 6.62; N, 9.20. Found (percent): C, 79.21; H, 6.60; N, 9.25.

The hydrochloride, after being recrystallized from ethanoldichloromethane, has M.P. 286–287° dec.

*Analysis.*—For $C_{20}H_{20}N_2O \cdot HCl$. Calc'd (percent): C, 70.48; H, 6.21; Cl, 10.40; N, 8.22. Found (percent): C, 70.25; H, 6.41; Cl, 10.43; N, 8.17.

We claim:
1. A compound of the formula:

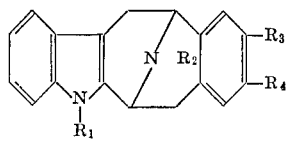

I wherein $R_1$ is hydrogen, lower alkyl or phenyl lower alkyl; $R_2$ is hydrogen, lower alkyl, or phenyl lower alkyl; $R_3$ is hydrogen, or lower alkoxy; and $R_4$ is hydrogen or lower alkoxy, and its non-toxic pharmaceutically acceptable acid addition salts.

2. The compound of claim 1 which is 6,7,12,13-tetrahydro - 9 - methoxy-14-methyl-6,12-imino-5H-benzo[5,6]-cyclooct[1,2-b]indole and its non-toxic pharmaceutically acceptable acid addition salts.

3. The compound of claim 1 which is 6,7,12,13-tetrahydro - 9 - methoxy-14-benzyl-6,12-imino-5H-benzo [5,6]-cyclooct[1,2-b]indole and its non-toxic pharmaceutically acceptable acid addition salts.

4. The compound of claim 1 which is 6,7,12,13-tetrahydro- 9,10 - dimethoxy - 14-methyl-6,12-imino-5H-benzo-[5,6]cyclooct[1,2-b]indole and its non-toxic pharmaceutically acceptable acid addition salts.

5. The compound of claim 1 which is 6,7,12,13-tetrahydro - 9 - methoxy - 5,14-dimethyl-6,12-imino-5H-benzo-[5,6]cyclooct[1,2-b]indole and its non-toxic pharmaceutically acceptable acid addition salts.

6. The compound of claim 1 which is 14-benzyl-6,7,12,13-tetrahydro - 9 - methoxy - 5 - methyl - 6,12-imino-5H-benzo[5,6]cyclooct[1,2-b]indole and its non-toxic pharmaceutically acceptable acid addition salts.

7. The compound of claim 1 which is 6,7,12,13-tetrahydro - 9 - methoxy - 5-methyl-6,12-imino-5H-benzo[5,6]cyclooct[1,2-b]indole and its non-toxic pharmaceutically acceptable acid addition salts.

8. The compound of claim 1 which is 6,7,12,13-tetrahydro - 9 - methoxy - 6,12 - imino-5H-benzo[5,6]cyclooct[1,2-b]indole and its non-toxic pharmaceutically acceptable acid addition salts.

9. Process for the production of a compound of the formula:

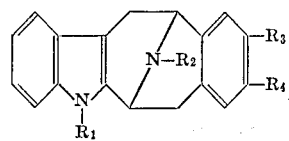

I wherein $R_1$ is hydrogen; $R_2$ is lower alkyl or phenyl lower alkyl which comprises contacting a compound of the formula:

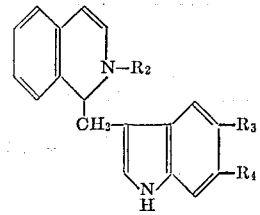

II with an excess of a dilute aqueous mineral acid at a temperature of about 90° C. to 98° C.

No references cited.

DONALD G. DAUS, Primary Examiner

U.S. Cl. X.R.

260—288; 424—258